US006815904B2

United States Patent
Choi (10) Patent No.: US 6,815,904 B2
(45) Date of Patent: Nov. 9, 2004

(54) BACKLIGHT UNIT, DRIVING APPARATUS FOR LIQUID CRYSTAL DISPLAY DEVICE USING THE SAME AND METHOD OF DRIVING THE SAME

(75) Inventor: Jong Hyun Choi, Incheon-kwangyeokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/462,723

(22) Filed: Jun. 17, 2003

(65) Prior Publication Data

US 2004/0125245 A1 Jul. 1, 2004

(30) Foreign Application Priority Data

Dec. 30, 2002 (KR) .............................. P10-2002-0087109

(51) Int. Cl.[7] .............................. G09G 3/10; G09G 3/34
(52) U.S. Cl. ..................................... 315/169.3; 345/110
(58) Field of Search ........................... 315/169.1, 169.2, 315/169.3, 169.4; 345/84, 87, 90, 110, 102, 103, 104, 105

(56) References Cited

U.S. PATENT DOCUMENTS

| 6,002,452 A | * | 12/1999 | Morgan ...................... 348/742 |
| 6,232,963 B1 | * | 5/2001 | Tew et al. ................... 345/204 |
| 6,535,187 B1 | * | 3/2003 | Wood .......................... 345/84 |
| 6,583,579 B2 | * | 6/2003 | Tsumura .................. 315/169.3 |
| 2001/0028224 A1 | * | 10/2001 | Tsumura ..................... 315/160 |

* cited by examiner

*Primary Examiner*—James Vannucci
*Assistant Examiner*—Minh Dieu A
(74) *Attorney, Agent, or Firm*—Morgan Lewis & Bockius LLP

(57) ABSTRACT

A backlight unit for a liquid crystal display panel includes a plurality of lamps each having a first electrode and a second electrode extending along a length of the lamp and at least one window formed by a first gap between the first and second electrodes, and a plurality of motors for rotating each of the plurality of lamps to irradiate light produced by the lamps onto the liquid crystal display panel.

24 Claims, 7 Drawing Sheets

BACKLIGHT UNIT, DRIVING APPARATUS FOR LIQUID CRYSTAL DISPLAY DEVICE USING THE SAME AND METHOD OF DRIVING THE SAME

The present invention claims the benefit of Korean Patent Application No. P2002-87109 filed in Korea on Dec. 30, 2002, which is hereby incorporated by reference.

BACKGROUND OF THE INVENTION

1. Field of the Invention

The present invention relates to a driving apparatus and method for a liquid crystal display, and more particularly to a driving apparatus and method for a liquid crystal display adaptive for improving brightness of the liquid crystal display.

2. Description of the Related Art

In general, liquid crystal display (LCD) devices are lightweight, have a thin profile, and have relatively low power consumption. Accordingly, the LCD devices are commonly implemented for office automation instruments, and audio and video devices. The LCD devices display image data on a screen by controlling light transmissivity in accordance with a video signal applied to a plurality of control switches.

The LCD devices are commonly replacing cathode ray tubes (CRTs) that use an impulse-type light emission by scanning of an electron gun. Conversely, the LCD devices use a hold-type light emission employing a backlight system, whereby a linear lamp (fluorescent lamp) is an illuminating light source. Accordingly, it is extremely difficult to display a series of images that results in a perfect motion picture. Specifically, when the series of images is displayed using the LCD devices, motion picture contour deterioration is generated due to operational characteristics of the hold-type light emission. Accordingly, picture quality is significantly deteriorated.

Figure 1:
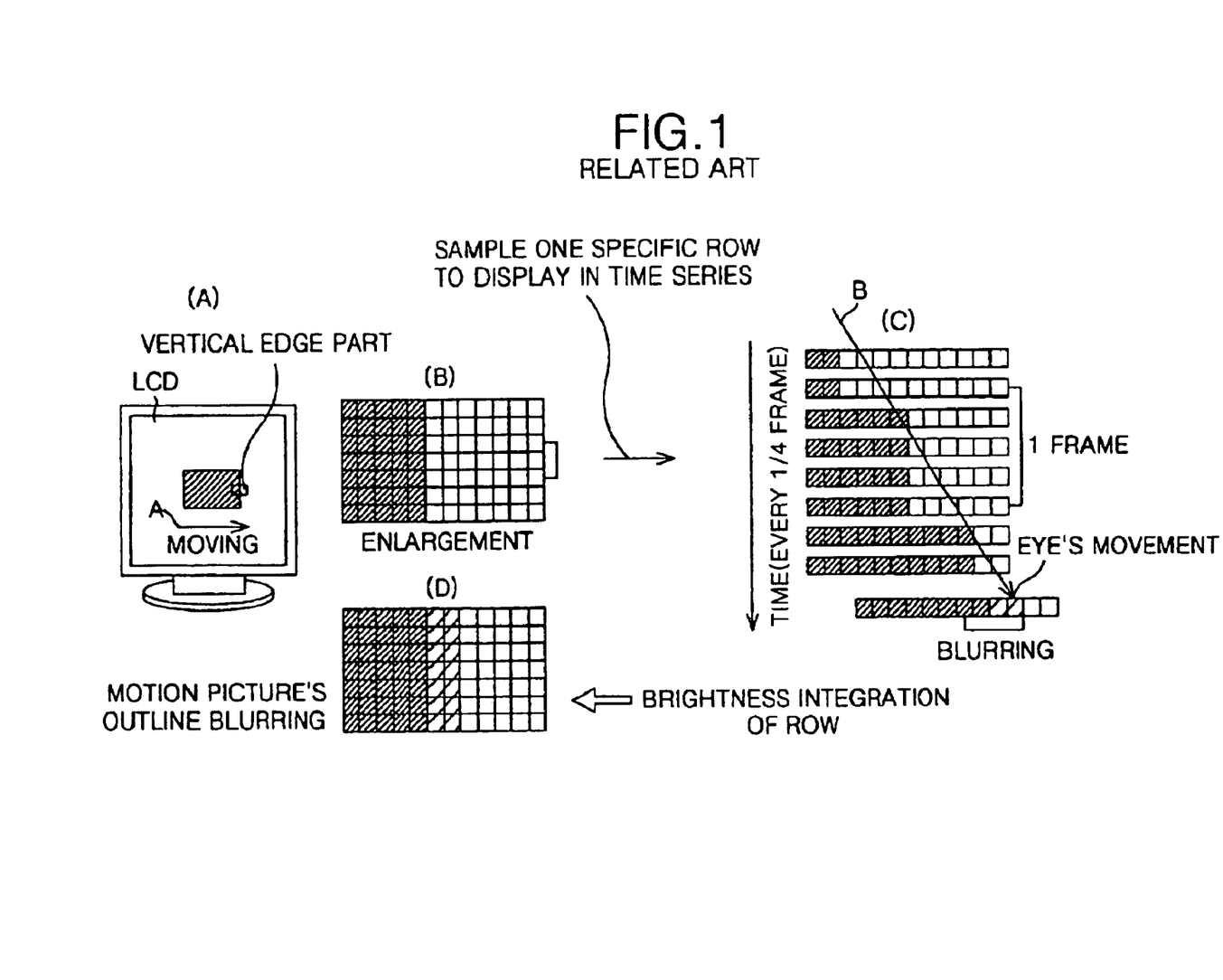
FIG. 1 is a simulation diagram illustrating generation of motion picture contour deterioration using hold-type light emission according to the related art.

FIG. 1 is a simulation diagram illustrating generation of motion picture contour deterioration using hold-type light emission according to the related art. In FIG. 1, (A) illustrates that a white image moving along a first direction A is displayed on part of a black background picture of an LCD, (B) is an enlarged diagram of a boundary area of black/white images, (C) is a diagram explaining a cause for generation of a motion picture contour deterioration, and (D) is an enlarged diagram illustrating a state of the motion picture contour deterioration. In FIG. 1, a unit square represents a pixel, and motion picture contour deterioration is identified as "blurring" or "motion picture blurring."

In (C) of FIG. 1, where one row of black/white boundary areas of (B) is displayed in a sequential time series, an observer's eyes move along a second direction B, which is inclined from top left to bottom right of the diagram, in accordance with movement of a display picture along the first direction A. Displayed pixel brightness is sustained or held even while one frame display is advanced. Integrating the displayed pixel brightness generates the motion picture contour deterioration, as shown in (D) of FIG. 1.

Figure 2:
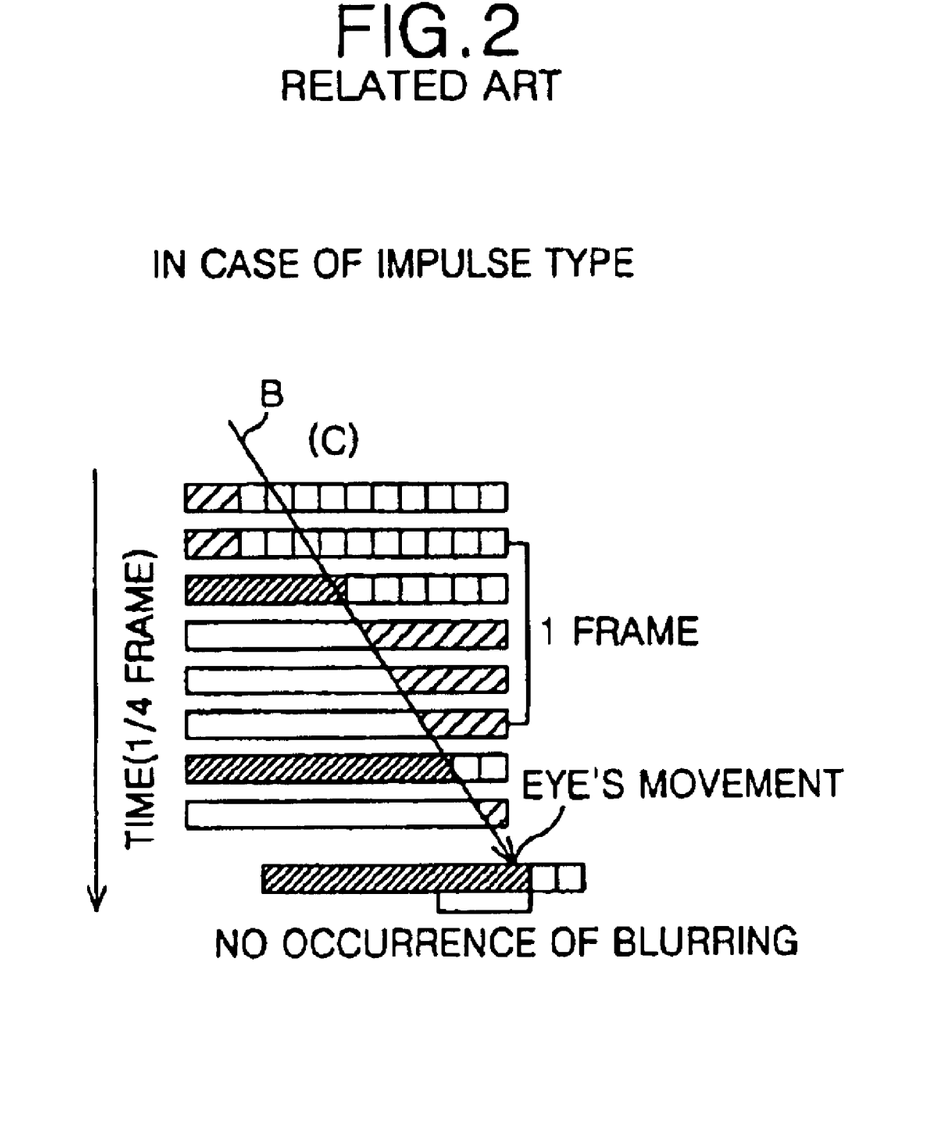
FIG. 2 is a simulation diagram illustrating generation of motion picture contour deterioration using a cathode ray tube CRT according to the related art.

FIG. 2 is a simulation diagram illustrating generation of motion picture contour deterioration using a cathode ray tube CRT according to the related art. In FIG. 2, (C) illustrates when the motion picture is displayed in the cathode ray tube (CRT) that lacking the hold-type light emission, wherein the pixel is not displayed while the image advances between adjacent frames. Thus, even though an observer's eyes move along the second direction B in accordance with movement of a display picture along the first direction A, no motion picture contour deterioration is generated. In other words, in the impulse-type light emission, such as the cathode ray tube (CRT), black data are displayed between a first frame and an adjacent new frame, so the display image becomes more vivid visually due presence of the black data.

Accordingly, as shown in (C) of both FIGS. 1 and 2, an observer's perceived image in the motion picture is vividly displayed in the cathode ray tube (CRT). Thus, the display picture becomes blurred in the LCD device because of the hold-type light emission characteristics of liquid crystal molecules in the LCD device. The difference of such a perceived image results from the integration effect of an image that temporarily continues in the observer's eye due to movement of the image. Accordingly, even though the response speed of the LCD device is relatively fast, the observer sees a blurred screen due to the physical response between movement of the observer's eyes and a stagnant image of each successive frame.

Figure 3:
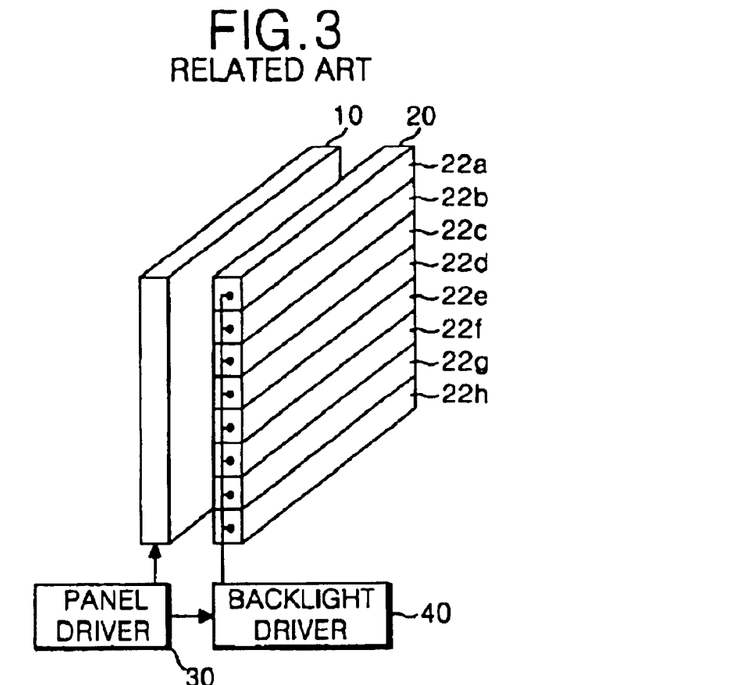
FIG. 3 is a perspective schematic view of a liquid crystal display using a sequential driving backlight unit according to the related art.

FIG. 3 is a perspective schematic view of a liquid crystal display using a sequential driving backlight unit according to the related art. In FIG. 3, a liquid crystal display includes a liquid crystal display panel 10, a direct backlight unit 20 that radiates light to the liquid crystal display panel 10 using a plurality of lamps 22a to 22n, a backlight driver 40 that sequentially drives the lamps 22a to 22n, and a panel driver 30 that drives the liquid crystal display panel 10 and controls the backlight driver 40.

The direct backlight unit 20 further includes a lamp housing (not shown) where the lamps 22a to 22n are horizontally arranged in parallel, and a diffusion panel (not shown) covering the whole surface of the lamp housing. In addition, the lamp housing (not shown) not only covers the lamps 22a to 22n, but also reflects light that progresses toward the rear of the lamps 22a to 22n to the liquid crystal display panel 10. Moreover, the diffusion panel (not shown) makes the light radiated from the lamps 22a to 22n to progress toward the liquid crystal display panel 10 and to be incident at an angle of a wide range. The diffusion panel includes members for light diffusion that are coated on both sides of a transparent resin film.

Accordingly, the lamps 22a to 22n are arranged in parallel along the horizontal direction and are sequentially driven to be synchronized with a scan speed applied to a gate line (not shown) of the liquid crystal cell 10. In addition, the lamps 22a to 22n each radiate light sequentially to a certain area on the liquid crystal display panel 10, and the backlight driver 40 responds to a control signal from the panel driver 30 to sequentially drive the lamps 22a to 22n.

The panel driver 30 drives a liquid crystal cell of the liquid crystal panel 10 and generates a control signal synchronized with the gate pulse that is applied to the gate line of the liquid crystal display panel 10. Thus, the lamps 22a to 22n are each sequentially turned ON in order to be synchronized with the scan speed of the gate line (not shown) of the liquid crystal display panel 10, thereby radiating light to a certain area of the liquid crystal display panel 10. Accordingly, the range where one of the lamps 22a to 22n can irradiate the liquid crystal display panel 10 with uniform brightness is restricted to the certain area. Therefore, the LCD device comprises many lamps such that a thickness of the LCD device increases due to the lamp housing that covers the lamps 22a to 22n.

SUMMARY OF THE INVENTION

Accordingly, the present invention is directed to a backlight unit and driving apparatus for a liquid crystal display device using the same, and method of driving the same that substantially obviates one or more of the problems due to limitations and disadvantages of the related art.

An object of the present invention is to provide a backlight unit adaptive for rotating a plurality of lamps to prevent motion blurring.

Another object of the present invention is to provide a driving apparatus for a liquid crystal display having a backlight unit adaptive for rotating a plurality of lamps to prevent motion blurring.

Another object of the present invention is to provide a method of driving a backlight unit adaptive for rotating a plurality of lamps to prevent motion blurring.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit for a liquid crystal display panel includes a plurality of lamps each having a first electrode and a second electrode extending along a length of the lamp and at least one window formed by a first gap between the first and second electrodes, and a plurality of motors for rotating each of the plurality of lamps to irradiate light produced by the lamps onto the liquid crystal display panel.

In another aspect, a backlight unit for a liquid crystal display panel includes a plurality of lamps generating light, a first electrode and a second electrode disposed along an interior of each of the lamps, a reflection plate disposed along an exterior of each of the lamps and having a window through which the light is radiated onto the liquid crystal display panel, and a plurality of motors for rotating each of the lamps.

In another aspect, a driving apparatus of a liquid crystal display panel includes a plurality of lamps having a window through which light is transmitted and having a first electrode and a second electrode which are separated with the window therebetween, a plurality of motors for rotating each of the lamps, and a liquid crystal display panel where the light is irradiated through the window.

In another aspect, a driving apparatus of a liquid crystal display panel includes a plurality of lamps for generating light, a first electrode and a second electrode disposed along an interior of each of the lamps, a reflection plate formed along an exterior of each of the lamps to have a window through which the light is radiated, a plurality of motors for rotating each of the lamps, and a liquid crystal display panel where the light is irradiated through the window.

In another aspect, a method for driving a backlight device includes rotating a plurality of lamps using a corresponding plurality of motors, each lamp having a window through which light is transmitted and having a first electrode and a second electrode which are separated with the window therebetween, wherein a liquid crystal display panel is irradiated by the light transmitted through the window.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
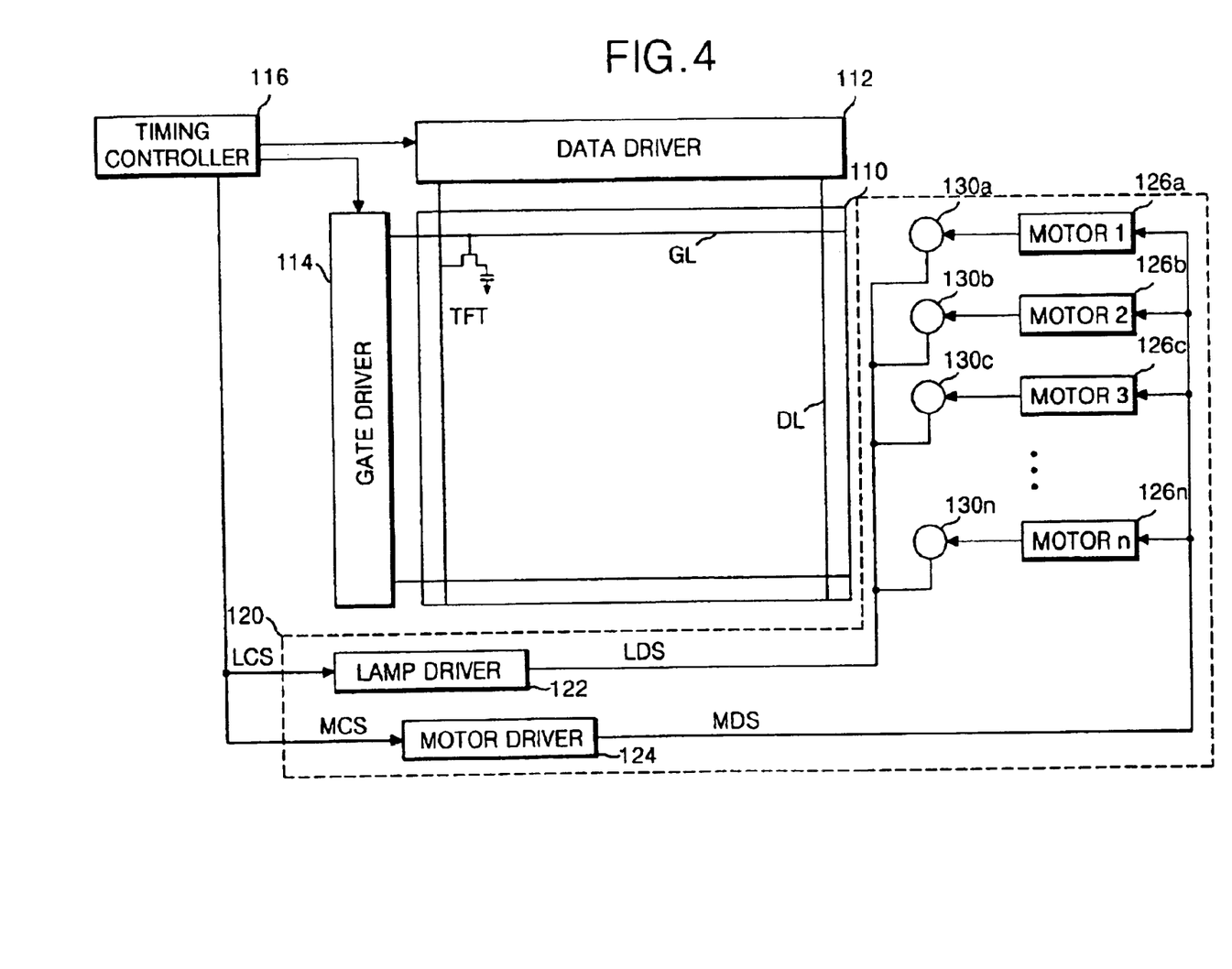
FIG. 4 is an exemplary schematic diagram of a backlight unit and a driving apparatus of a liquid crystal display according to the present invention.

FIG. 4 is an exemplary schematic diagram of a backlight unit and a driving apparatus of a liquid crystal display according to the present invention. In FIG. 4, a liquid crystal display panel 110 may include thin film transistors (TFTs) formed at intersections where data lines DL cross gate lines GL, a data driver 112 for applying data to the data lines DL of the liquid crystal display panel 110, a gate driver 114 for applying gate pulses to the gate lines GL of the liquid crystal display panel 110, a direct backlight unit 120 for driving a plurality of lamps 130a to 130n and for sequentially rotating the lamps 130a to 130n to radiate light onto the liquid crystal display panel 110, and a timing controller 116 for controlling the direct backlight unit 120 and controlling the data and gate drivers 112 and 114.

The liquid crystal display panel 110 may include liquid crystal material injected between two glass substrates. The TFT formed at the intersection of the data and gate lines DL and GL of the liquid crystal display 110 responds to a scan pulse from the gate driver 114 to apply the data in the data line DL to a liquid crystal cell. A source electrode of the TFT may be connected to the data line, a drain electrode of the TFT may be connected to a pixel electrode of the liquid crystal cell, and a gate electrode of the TFT may be connected to the gate line GL. The liquid crystal display panel 110 may be disposed on a diffusion panel (not shown) of the direct backlight unit 120.

The timing controller 116 may realign digital video data applied from a digital video card (not shown) according to red R, green G, and blue B colors. The data RGB realigned by the timing controller 116 may be applied to the data driver 112. In addition, the timing controller 116 may generate horizontal data control signals to the data driver 122 and vertical gate control signals to the gate driver 114. The data control signals may include dot clock signals Dclk, source shift clock signals SSC, source enable signals SOE, and polarity inversion signals POL. The gate control signals may include gate start pulses GSP, gate shift clock signals GSC, and gate output enable signals GOE. The timing controller 116 may generate lamp control signals LCS that are synchronized with the gate control signals applied to the gate line GL of the liquid crystal display panel 110 to apply to a lamp driver 122. In addition, the timing controller 116 may generate motor control signals MCS that are synchronized with the gate control signals applied to the gate line GL of the liquid crystal display panel 110 to apply to a motor driver 124.

The data driver 112 may sample data in accordance with the data control signals transmitted by the timing controller 116, and then may latch the sampled data as one line portion. Next, the data driver may convert the latched data into an analog gamma voltage from a gamma voltage supplier (not shown).

The gate driver 114 may include a shift register that sequentially generates a gate pulse in response to the gate start pulse signal GSP transmitted along with the gate control signals. In addition, the gate driver 114 may include a level shifter that shifts a voltage of the gate start pulse signal GSP to a voltage level suitable for driving the liquid crystal cell.

The direct backlight unit 120 may include a plurality of lamps 130a to 130n, a plurality of motors 126a to 126n that rotate each of the lamps 130a to 130n, the lamp driver 122 that sequentially turns ON the lamps 130a to 130n in response to the lamp control signals LCS transmitted by the timing controller 116, and the motor driver 124 that drives motors 126a to 126n in response to the motor control signals MCS transmitted from the timing controller 116. The diffusion panel (not shown) may be disposed between the direct backlight unit 120 and the liquid crystal display panel 110 to make the light radiated from the lamps 130a to 130n progress toward the liquid crystal display panel 110. The diffusion panel (not shown) may include members coated on both sides of a transparent resin film.

Figure 5:
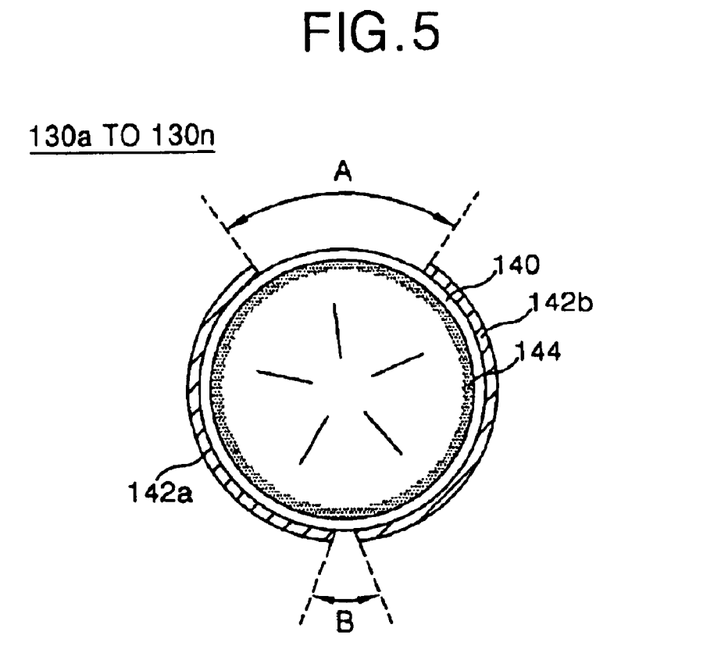
FIG. 5 is a cross sectional view of an exemplary lamp structure according to the present invention.

FIG. 5 is a cross sectional view of an exemplary lamp structure according to the present invention. In FIG. 5, each of the lamps 130a to 130n may include a circular lamp glass 140, a fluorescent body 144 coated on an inner wall of the lamp glass 140, first and second external electrodes 142a, and 142b each having different sizes and gaps therebetween and formed to face an outer wall of the lamp glass 140.

The fluorescent body 144 may be coated on the inner wall of the lamp glass 140 to produce visible light to an exterior of the lamp glass 140 due to application of a strong electric field between the first and second external electrodes 142a and 142b. The first and second external electrodes 142a and 142b not only apply the strong electric field to the inside of the lamp glass 140, but may function as a reflection plate to radiate the light generated from the lamp glass 140 along a single direction. The first and second external electrodes 142a and 142b may be separated by a first gap defining a first window A and by a second gap defining a second window B. Here, the first window A is larger than the second window B, thereby a majority of the light generated in the lamp glass 140 may be transmitted through the first window A as compared to an amount of light transmitted through the second window B. Accordingly, the light generated in the lamp glass 140 may be reflected by the first and second external electrodes 142a and 142b so that the majority of the light is radiated toward the liquid crystal display panel 110 (in FIG. 4) via the first window A.

The lamp driver 122 may be connected to each of the lamps 130a to 130n, and may respond to the lamp control signals LCS transmitted by the timing controller 116. Accordingly, the lamp driving signals LDS may be generated so that they are synchronized with the gate control signals applied to the gate line GL (in FIG. 4) of the liquid crystal display panel 110 (in FIG. 4) in order to sequentially turn ON each of the lamps 130a to 130n. Thus, each of the lamps 130a to 130n may respond to the lamp driving signals LDS transmitted by the lamp driver 122 to radiate light to a designated area of the liquid crystal display panel 110 (in FIG. 4).

The motor driver 124 may be connected to each of the motors 126a to 126n, and may respond to the motor control signals MCS transmitted by the timing controller 116. Accordingly, the motor driving signals MDS may be generated for rotating each of the motors 126a to 126n. The motor driving signal MDS is synchronized with the gate control signal applied to the gate line of the liquid crystal display panel 110.

Each of the motors 126a to 126n may be installed adjacent to each of the lamps 130a to 130n, and may respond to the motor driving signals MDS transmitted by the motor driver 124 to rotate each of the lamps 130a to 130n. Accordingly, a rotation speed of each of the motors 126a to 126n may be about 60 revolutions per second (rps) to be synchronized with the gate control signals applied to the gate line GL (in FIG. 4) of the liquid crystal display panel 110 (in FIG. 4).

Figure 6:
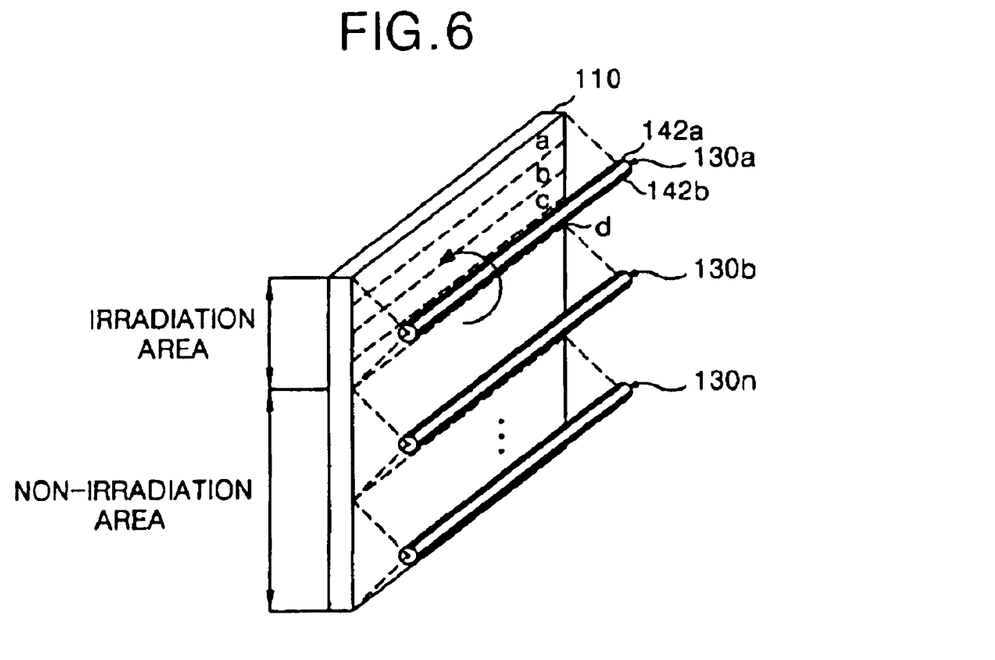
FIG. 6 is a perspective schematic view of an exemplary liquid crystal display panel according to the present invention.

FIG. 6 is a perspective schematic view of an exemplary liquid crystal display panel according to the present invention. The backlight unit and the driving apparatus of the exemplary liquid crystal display may include those discussed with regard to FIG. 4. In FIG. 6, the lamp driver 122 (in FIG. 4) may sequentially turn ON each of the lamps 130a to 130n to be synchronized with the gate control signals applied to the gate line GL (in FIG. 4) of the liquid crystal display panel 110. Simultaneously, the motor driver 124 (in FIG. 4) may rotate the lamps 130a to 130n to radiate the light from the first windows A (in FIG. 5) of the lamps 130a to 130n to a first designated area (illuminated area) of the liquid crystal display panel 110. For example, in the first designated area of the liquid crystal display panel 110, the light radiated from the first window A (in FIG. 5) of the first lamp 130a may be irradiated in an order of a-b-c-d areas of the first designated area by rotation of the first lamp 130a. Accordingly, in a second designated area (non-irradiation area) of the liquid crystal display panel 110, the light from the second lamp 130b to the $n^{th}$ lamp 130n is not irradiated.

Next, in the second designated area to an $n^{th}$ area of the liquid crystal display panel 110, the light is sequentially irradiated by rotation of each of the second lamp 130b to the $n^{th}$ lamp 130n as in the first designated area. Specifically, in the backlight unit and the driving apparatus of the liquid crystal display in FIG. 4, the gate driver 114 sequentially applies the gate control signal to the gate lines GL (in FIG. 4) of the liquid crystal display panel 110, and the data driver 112 applies data to the data lines DL (in FIG. 4) of the liquid crystal display panel 110. Moreover, the lamp driver 122 applies the lamp driving signals LDS to the lamps 130a to 130n in accordance with the lamp control signals transmitted by the timing controller 116, thereby sequentially turning ON each of the lamps 130a to 130n. Furthermore, the motor driver 124 applies the motor driving signals MDS to the motors 126a to 126n in accordance with the motor control signal transmitted by the timing controller 116, thereby rotating the motors 126a to 126n. Accordingly, each of the lamps 130a to 130n is rotated by each of the motors 126a to 126n to be synchronized with the gate control signal of the liquid crystal display panel 110, and radiates the light to designated areas of the liquid crystal display panel 110. Thus, as shown in FIG. 5, the light is reflected by the first and second external electrodes 142a and 142b, and is emitted through the first window A. Therefore, the light is irradiated as an impulse-type light emission onto the liquid crystal display panel 110.

The irradiation area of the light irradiated onto the liquid crystal display panel 110 from one lamp may be widened by the rotation of the lamp, but, as shown in FIG. 5, a majority of the light may be emitted only along one direction, i.e., through the first window A, by the first and second external electrodes 142a and 142b. Accordingly, a significant amount of light may be instantaneously irradiated using the impulse-type light emission, thereby increasing light efficiency. Thus, "motion blurring" and image contrast may be improved. Furthermore, a total number of the lamps may be reduced since the light may be irradiated onto a wider area of the liquid crystal display panel 110 by rotation of the lamps. Accordingly, overall thickness of the device may be reduced since the first and second external electrodes 142a and 142b may each function as reflection plates of the lamps 130a to 130n.

Figure 7:
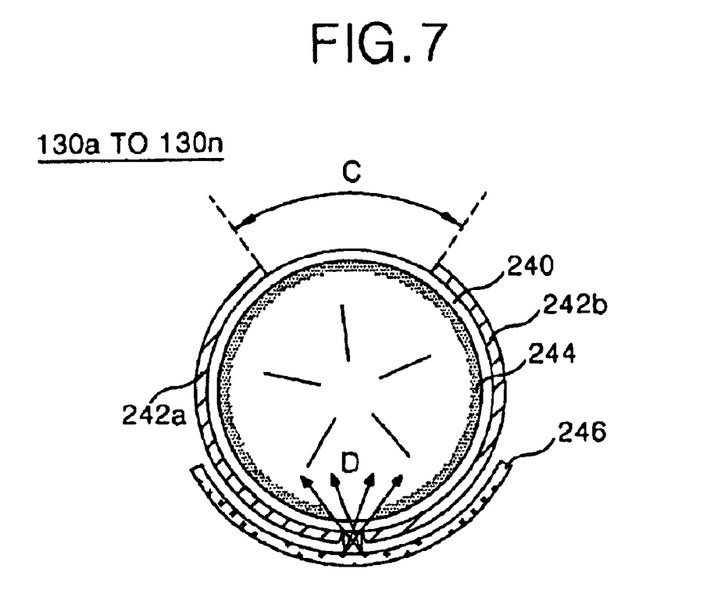
FIG. 7 is a cross sectional view of another exemplary lamp structure according to the present invention.

FIG. 7 is a cross sectional view of another exemplary lamp structure according to the present invention. The exemplary lamp structure of FIG. 7 may be used in the backlight unit and the driving apparatus of the exemplary liquid crystal display may include those discussed with regard to FIG. 4. In FIG. 7, each of the lamps 130a to 130n may include a circular lamp glass 240, a fluorescent body 244 coated on an inner wall of the lamp glass 240, first and second external electrodes 242a and 242b having different sizes and gaps therebetween, and a reflection plate installed to cover any one of the gaps between both ends of the first and second external electrodes 242a and 242b.

The fluorescent body 244 may be coated on the inner wall of the lamp glass 240 to produce visible light to an exterior of the lamp glass 240 by application of a strong electric field from the first and second external electrodes 242a and 242b. The first and second external electrodes 242a and 242b may not only apply the strong electric field along an exterior of the lamp glass 240, but may function as a reflection plate to radiate the light generated from the lamp glass 240 along a single direction. The first and second external electrodes 242a and 242b may be separated by a first gap defining a first window C and by a second gap defining a second window D. Here, the first window C is larger than the second window D, thereby a majority of the light generated in the lamp glass 240 may be transmitted through the first window C as compared to an amount of light transmitted through the second window D.

The reflection plate 246 may be disposed to cover the second window D for reflecting the light emitted to the outside through the second window D to the first window C, thereby minimizing light loss. Accordingly, the backlight unit and the driving apparatus of the liquid crystal display according to FIG. 7 may irradiate the light that is reflected by the first and second external electrodes 242a and 242b, and the light that is emitted to the second window D may be reflected to the first window C by the reflection plate 246, through the first window C onto the liquid crystal display panel 110 (in FIG. 4) while rotating the lamps 130a to 130n. Specifically, the lamp driver 122 (in FIG. 4) may sequentially turn ON each of the lamps 130a to 130n to be synchronized with the gate control signal applied to the gate line GL (in FIG. 4) of the liquid crystal display panel 110 (in FIGS. 4 and 6). In addition, the motor driver 124 (in FIG. 4) may simultaneously rotate the lamps 130a to 130n to radiate the light from the first windows A of the lamps 130a to 130n to the first designated area (irradiation area) of the liquid crystal display panel 110 (in FIG. 6). For example, in the first designated area of the liquid crystal display panel 110, the light radiated from the first window A of the first lamp 130a (in FIG. 7) may be irradiated in an order of a-b-c-d areas of the first designated area by rotation of the first lamp 130a. Next, in the second area to $n^{th}$ area of the liquid crystal display panel 110, the light may be sequentially irradiated by rotation of each of the second lamp 130b to the $n^{th}$ lamp 130n as in the first designated area. Accordingly, the "motion blurring" and contrast may be improved, thereby increasing high brightness and light efficiency since a significant amount of light may be irradiated using the impulse-type light emission onto a narrow area of the liquid crystal display panel 110. Furthermore, a total number of lamps may be reduced since the light may be irradiated onto a wider area of the liquid crystal display panel 110 by rotation of the lamps, thereby reducing an overall thickness of the device because the first and second external electrodes 142a and 142b each act as a reflection plate in the lamps 130a to 130n.

Figure 8:
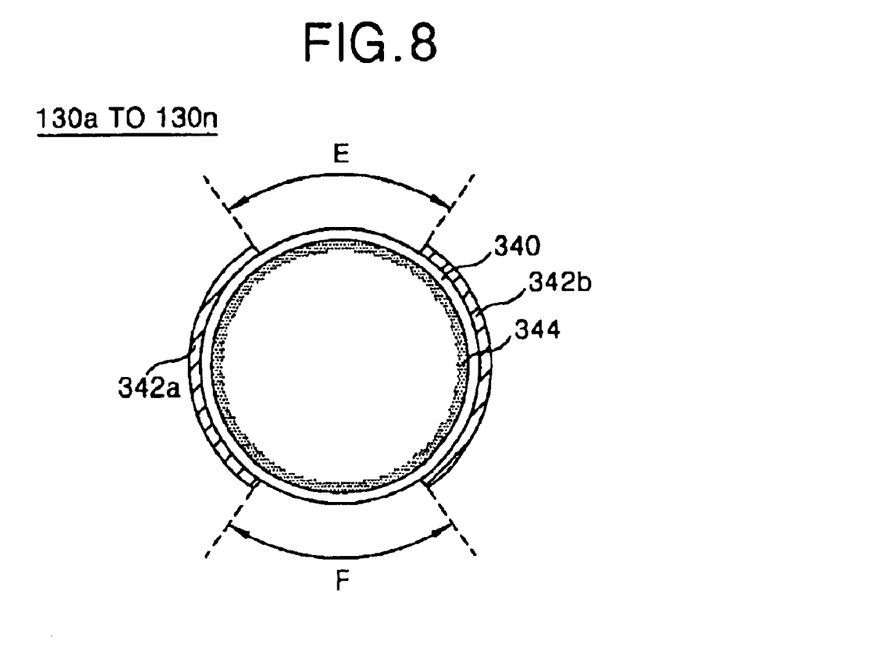
FIG. 8 is a cross sectional view of another exemplary lamp structure according to the present invention.

FIG. 8 is a cross sectional view of another exemplary lamp structure according to the present invention. The exemplary lamp structure of FIG. 7 may be used in the backlight unit and the driving apparatus of the exemplary liquid crystal display may include those discussed with regard to FIG. 4. In FIG. 8, the lamps 130a to 130n may include a circular lamp glass 340, a fluorescent body 344 coated on an inner wall of the lamp glass 340, and first and second external electrodes 342a and 342b.

The fluorescent body 344 may be coated on the inner wall of the lamp glass 340 to produce visible light to an exterior of the lamp glass 340 by application of a strong electric field from the first and second external electrodes 342a and 342b. The first and second external electrodes 342a and 342b may not only apply the strong electric field to the inside of the lamp glass 340, but may function as a reflection plate that radiates the light generated from the lamp glass 340 along a single direction. The first and second external electrodes 342a and 342b may be separated by a first gap defining a first window E and by a second gap defining a second window F. Here, a width of the first window E may be equal to a width of the second window D, thereby equal amounts of the light generated in the lamp glass 240 may be transmitted through the first and second windows E and F.

In the backlight unit and the driving apparatus of the liquid crystal display using the same according to the third embodiment of the present invention, the motors (not shown) rotate each of the lamps 130a to 130n such that they radiate the light in both directions. At this moment, the rotation speed of each of the motors has half of the frequency of the gate control signal applied to the gate lines of the liquid crystal display panel because each of the lamps 130a to 130n radiate the same amount of light through the first window E and the second window F in both directions.

Figure 9A:
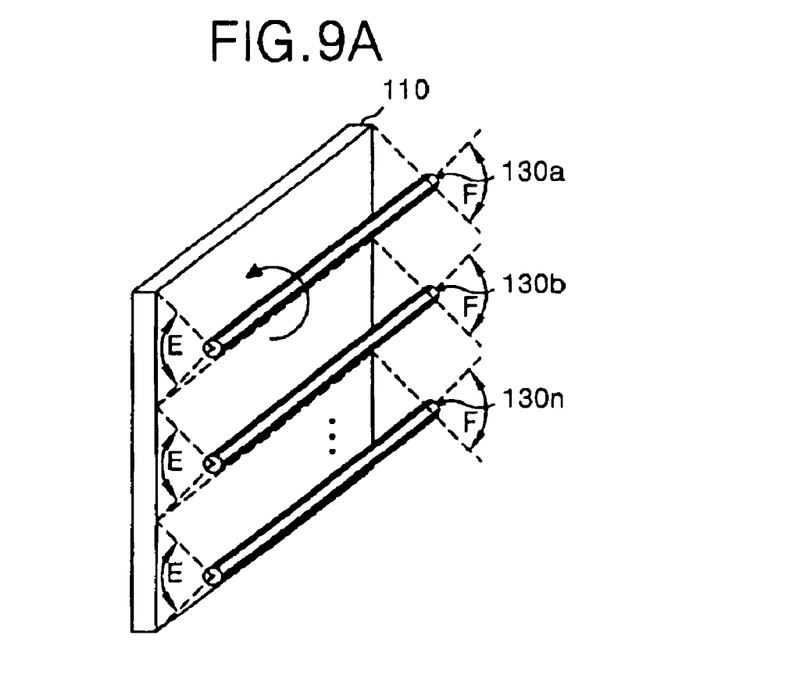
FIGS. 9A and 9B are perspective schematic views of another exemplary liquid crystal display panel according to the present invention.
Figure 9B:
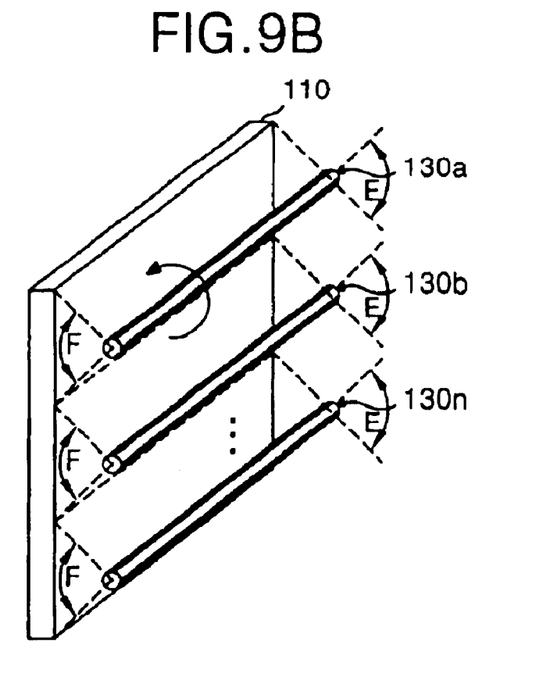

FIGS. 9A and 9B are perspective schematic views of another exemplary liquid crystal display panel according to the present invention. In FIGS. 9A and 9B, each of the motors 126a to 126n (in FIG. 4) may rotate each of the lamps 130a to 130n at a rate of about 30 revolutions per second (rps), whereby the light may be irradiated using an impulse-type light emission onto a designated area of the liquid crystal display panel 110 through the first window E, and then the light may be irradiated using an impulse-type light emission onto the designated area of the liquid crystal display panel 110 through the second window F. Accordingly, "motion blurring" and contrast may be improved and high brightness and light efficiency may be increased since a significant amount of light may be irradiated using the impulse-type light emission onto a narrow area of the liquid crystal display panel 110. Furthermore, a total number of the lamps may be reduced since the light may be irradiated onto the wide area of the liquid crystal display panel 110 by rotation of the lamps. Accordingly, an overall thickness of the device may be reduced since the first and second external electrodes 342a and 342b may function as reflection plates in the lamps 130a to 130n.

Figure 10:
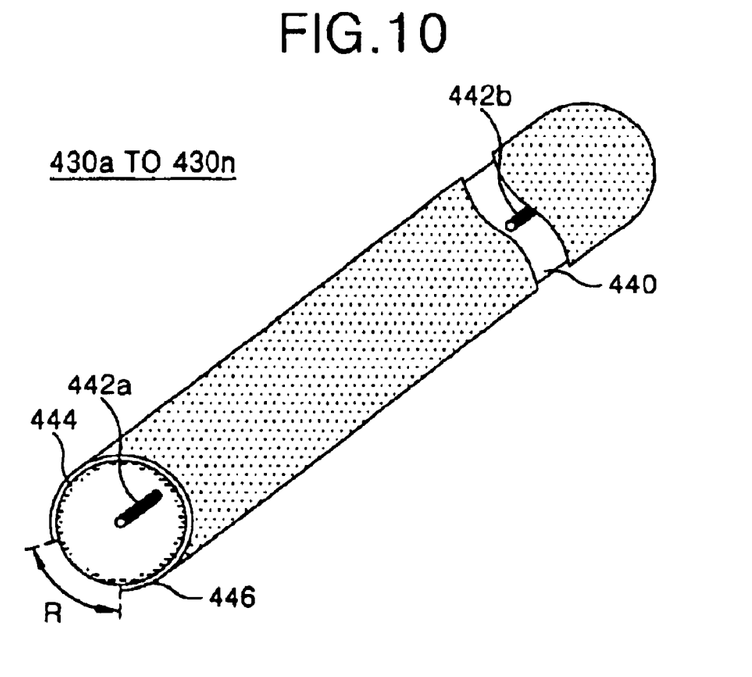
FIG. 10 is a perspective view of another exemplary lamp structure according to the present invention.

FIG. 10 is a perspective view of another exemplary lamp structure according to the present invention. The exemplary lamp structure of FIG. 10 may be used in the backlight unit and the driving apparatus of the exemplary liquid crystal display may include those discussed with regard to FIG. 4. In FIG. 10, each of the lamps 430a to 430n may include a circular lamp glass 440, a fluorescent body 444 coated on an inner wall of the lamp glass 440, first and a second internal electrode 442a and 442b may be installed at both ends inside the lamps 430a to 430n, and a reflection plate 446 may be installed at an outer wall of the lamp glass 440 having a window R through which light generated in the lamp glass 440 is radiated to an exterior.

The fluorescent body 444 may be coated on the inner wall of the lamp glass 440 to generate visible light to the exterior of the lamp glass 440 by application of a strong electric field from the first and second internal electrodes 442a and 442b. The first and second internal electrodes 442a and 442b may be inserted into the inside of both ends of the lamp glass 440 to apply the strong electric field to the inside of the lamp glass 440. The reflection plate 446 may be formed along the outer wall of the lamp glass 440 except at a region corresponding to the window R to reflect the light generated in the lamp glass 440 to radiate through the window R.

In the backlight unit and the driving apparatus of the liquid crystal display according to FIG. 10, each of the lamps 430a to 430n may be made to rotate by the motors 126a to 126n (in FIG. 4). Accordingly, each of the lamps 430a to 430n may radiate the light through the window R, wherein a rotation speed of each of the motors 126a to 126n (in FIG. 4) may be about 60 revolutions per second (rps), which may be synchronized with the gate control signal applied to the gate line GL (in FIG. 4) of the liquid crystal panel 110 (in FIGS. 4, 6, 9A, and 9B). Accordingly, the backlight unit and the driving apparatus of the liquid crystal display according to FIG. 4 radiates the light reflected to the window R by the reflection plate 446 through the window R to irradiate the liquid crystal display panel 110 (in FIGS. 4, 6, 9A, and 9B). That is, the light radiated from the window R of the first lamp 430a may be irradiated onto a first area of the liquid crystal display panel 110 (in FIGS. 4, 6, 9A, and 9B) in an order of a-b-c-d areas of the first area by the rotation of the first lamp 430a. Then, the light may be sequentially irradiated onto the second to $n^{th}$ area of the liquid crystal display panel 110 (in FIGS. 4, 6, 9A, and 9B) by rotation of each of the second to $n^{th}$ lamp 430b to 430n. Accordingly, "motion blurring" and contrast may be improved and high brightness and light efficiency may be increased since a significant amount of light may be irradiated using the impulse-type light emission onto a narrow area of the liquid crystal display panel 110 (in FIGS. 4, 6, 9A, and 9B). Furthermore, a total number of the lamps may be reduced since the light may be irradiated onto a wide area of the liquid crystal display panel 110 (in FIGS. 4, 6, 9A, and 9B) by rotation of the lamps. Accordingly, an overall thickness of the device may be reduced since the first and second internal electrodes 442a and 442b may each function as a reflection plate in the lamps 430a to 430n.

It will be apparent to those skilled in the art that various modifications and variations can be made in the backlight unit, driving apparatus for liquid crystal display device using the same, and method of driving the same of the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display panel, comprising:
   a plurality of lamps each having a first electrode and a second electrode extending along a length of the lamp and at least one window formed by a first gap between the first and second electrodes; and
   a plurality of motors for rotating each of the plurality of lamps to irradiate light produced by the lamps onto the liquid crystal display panel.

2. The backlight unit according to claim 1, further comprising:
   a motor driver for sequentially rotating each of the motors; and
   a lamp driver for sequentially turning on each of the lamps to produce the irradiated light.

3. The backlight unit according to claim 1, wherein the lamps each include a second gap between the first and second electrodes and a second window formed by the second gap, wherein the first gap is larger than the second gap.

4. The backlight unit according to claim 3, further comprising a reflection plate covering the second window.

5. The backlight unit according to claim 1, wherein the lamps include a second gap between the first and second electrodes, wherein the first gap is equal to the second gap.

6. The backlight unit according to claim 1, wherein the first and second electrodes each reflect the irradiated light to the at least one window.

7. The backlight unit according to claim 1, wherein the first and second electrodes have equal lengths.

8. A backlight unit for a liquid crystal display panel, comprising:
   a plurality of lamps generating light;
   a first electrode and a second electrode disposed along an interior of each of the lamps;
   a reflection plate disposed along an exterior of each of the lamps and having a window through which the light is radiated onto the liquid crystal display panel; and
   a plurality of motors for rotating each of the lamps.

9. The backlight unit according to claim 8, further comprising:
   a motor driver for sequentially rotating each of the motors; and
   a lamp driver for sequentially turning on each of the lamps.

10. A driving apparatus of a liquid crystal display panel, comprising:
- a plurality of lamps having a window through which light is transmitted and having a first electrode and a second electrode which are separated with the window therebetween;
- a plurality of motors for rotating each of the lamps; and
- a liquid crystal display panel where the light is irradiated through the window.

11. The driving apparatus according to claim 10, further comprising:
- a motor driver for sequentially rotating each of the motors; and
- a lamp driver for sequentially turning on each of the lamps.

12. The driving apparatus according to claim 10, wherein each of the motors rotates so as to be synchronized with a scan speed of a gate control signal applied to gate lines of the liquid crystal display panel.

13. The driving apparatus according to claim 10, wherein a rotation speed of each of the motors is about one-half a scan speed of a gate control signal applied to gate lines of the liquid crystal display panel.

14. The driving apparatus according to claim 10, wherein the window includes:
- a first window having a first gap between the first and second electrodes; and
- a second window having a second gap smaller than the first gap between the first and second electrodes.

15. The driving apparatus according to claim 14, further comprising a reflection plate covering the second window.

16. The driving apparatus according to claim 10, wherein the window includes a first window and a second window each having an equal width between the first and second electrodes.

17. The driving apparatus according to claim 10, wherein the first and second electrodes each reflect the light to the window.

18. The driving apparatus according to claim 10, wherein the first and second electrodes have equal lengths.

19. A driving apparatus of a liquid crystal display panel, comprising:
- a plurality of lamps for generating light;
- a first electrode and a second electrode disposed along an interior of each of the lamps;
- a reflection plate formed along an exterior of each of the lamps to have a window through which the light is radiated;
- a plurality of motors for rotating each of the lamps; and
- a liquid crystal display panel where the light is irradiated through the window.

20. The driving apparatus according to claim 19, further comprising:
- a motor driver for sequentially rotating each of the motors; and
- a lamp driver for sequentially turning on each of the lamps.

21. The driving apparatus according to claim 19, wherein each of the motors rotates so as to be synchronized with a scan speed of a gate control signal applied to gate lines of the liquid crystal display panel.

22. A method for driving a backlight device, comprising:
- rotating a plurality of lamps using a corresponding plurality of motors, each lamp having a window through which light is transmitted and having a first electrode and a second electrode which are separated with the window therebetween,
- wherein a liquid crystal display panel is irradiated by the light transmitted through the window.

23. The method according to claim 22, further comprising steps of:
- sequentially rotating each of the motors using a motor driver; and
- sequentially turning on each of the lamps using a lamp driver.

24. The method according to claim 23, wherein the step of sequentially rotating each of the motors includes synchronization with a scan speed of a gate control signal applied to gate lines of the liquid crystal display panel.

* * * * *